United States Patent [19]
Eide

[11] Patent Number: 4,521,026
[45] Date of Patent: Jun. 4, 1985

[54] SHAFT SEAL

[75] Inventor: Daniel L. Eide, Carmel, Ind.

[73] Assignee: RCA Corporation, Princeton, N.J.

[21] Appl. No.: 534,386

[22] Filed: Sep. 21, 1983

[51] Int. Cl.³ .............................................. F16J 15/34
[52] U.S. Cl. ....................................... 277/134; 277/16
[58] Field of Search .................................. 277/134, 16

[56] References Cited
U.S. PATENT DOCUMENTS

| | | | |
|---|---|---|---|
| 450,004 | 4/1891 | Daley . | |
| 2,182,981 | 12/1939 | Drost et al. | 286/5 |
| 2,383,531 | 8/1945 | Caruthers | 286/5 |
| 2,713,927 | 7/1955 | Rabinow | 192/21.5 |
| 2,818,284 | 12/1957 | Stevens | 277/16 |
| 2,865,615 | 12/1958 | Slaughter | 277/16 |
| 3,004,782 | 10/1961 | Meermans | 286/5 |
| 3,071,384 | 1/1963 | Friberg | 277/3 |
| 3,700,247 | 10/1972 | Butler et al. | 277/134 |

Primary Examiner—Robert I. Smith
Attorney, Agent, or Firm—Birgit E. Morris; Donald S. Cohen

[57] ABSTRACT

A packingless shaft seal between an apparatus housing and a rotatable shaft. The shaft seal includes a sleeve mounted on the shaft and a seal housing mounted on the apparatus housing and around the sleeve. The sleeve has a variable pitch thread extending from its ends within the apparatus housing to the seal housing and a cylindrical portion within and spaced from the inner surface of the seal housing. The variable pitch thread is directed toward the interior of the apparatus housing so that upon rotation of the shaft, material entering the thread is moved back into the apparatus housing. The seal housing has a chamber therein through which a temperature control material flows to control the temperature of the material passing between the seal housing and the sleeve.

6 Claims, 1 Drawing Figure

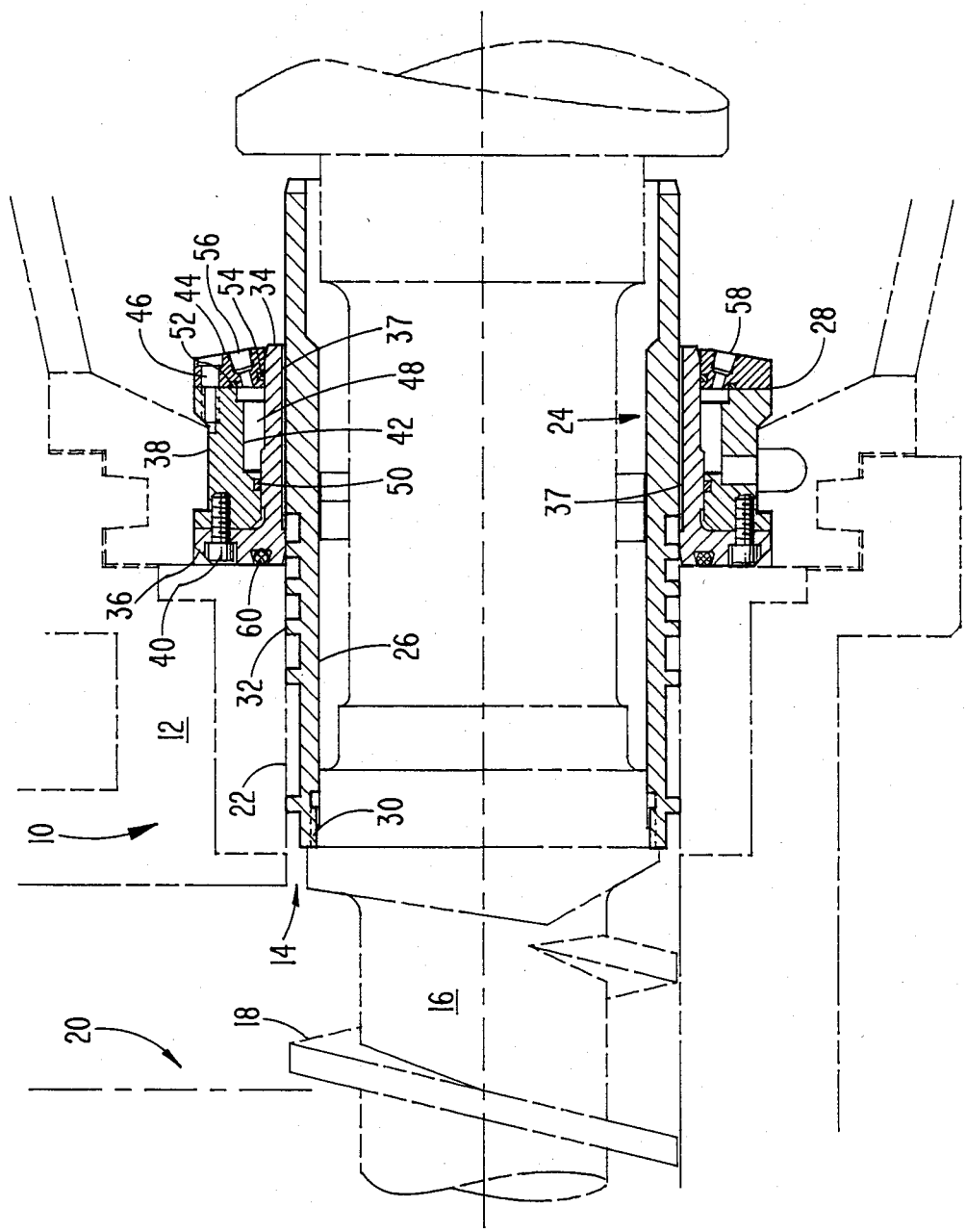

SHAFT SEAL

BACKGROUND OF THE INVENTION

The present invention relates to a shaft seal, and more particularly to a packingless shaft seal.

In preparing a thermoplastic material for use in compression or injection molding, the ingredients of the plastic material are generally mixed together and then passed through an extruder to pelletize the plastic material. The extruder generally includes a shaft having a screw thread in its outer surface and rotatably supported in a housing. The thermoplastic material is fed to the shaft at the rear end of the screw thread and is forced along the screw thread to a pelletizing mechanism at the front end of the shaft. The rear end of the shaft is generally supported in a bearing having a seal which prevents the thermoplastic material from flowing rearwardly along the shaft. The shaft seal generally includes some type of packing material around the shaft. However, when extruding certain types of thermoplastic material, it was found that the extruded plastic material contained contaminating particles which were pieces of the packing material. Therefore, for extruding this type of thermoplastic material, it was found desirable to have an extruder which includes a packingless shaft seal which would not contaminate the plastic material but which would provide the desired sealing action.

SUMMARY OF THE INVENTION

An apparatus includes a housing, a shaft rotatably supported in a bearing in the housing and a seal between the shaft and surface of the housing preventing the flow of material from the interior of the housing along the shaft. The seal includes a sleeve surrounding and secured to the shaft to rotate therewith. The sleeve extends along the surface of the housing and has in its outer surface a variable pitch thread with the threads being directed towards the interior of the housing so as to direct any material entering the thread back into the housing upon rotation of the shaft.

BRIEF DESCRIPTION OF THE DRAWING

The FIGURE of the drawing is a sectional view of a portion of an extruder which includes the shaft seal of the present invention.

DETAILED DESCRIPTION OF PREFERRED EMBODIMENT

Referring to the drawing, a plastic extruding apparatus which incorporates the seal of the present invention is generally designated as 10. The extruding apparatus 10 includes a housing 12 having a passage 14 extending longitudinally therethrough. Within the passage 14 is a shaft 16 which is supported in bearings (not shown) which allow rotation of the shaft 16 with respect to the housing 12 as well as slight longitudinal movement of the shaft with respect to the housing. The portion of the shaft 16 within the housing 12 has an external thread 18 which is adapted to move plastic material along the shaft 16 from an inlet opening 20 at the back end of the housing 12 to a pelletizing mechanism (not shown) at the front end of the housing 12. The passage 14 has a cylindrical surface portion 22 extending from the inlet opening 20 to the back end of the housing 12. The shaft seal of the present invention, generally designated as 24, is mounted along the shaft 16 and cylindrical surface 22 between the inlet opening and the back end of the housing to prevent plastic material entering the inlet opening 20 from passing out of the back end of the housing 12.

The shaft seal 24 includes a cylindrical sleeve 26 surrounding and secured to the shaft 16 and a seal housing 28 surrounding the sleeve 26 and secured to the housing 12 at the back end thereof. The sleeve 26 extends from adjacent the inlet opening 20 along the cylindrical surface 22 and the seal housing 28 to a point beyond the seal housing 28 and beyond the back end of the housing 12. The sleeve 26 has an internally threaded portion 30 at its forward end which is threaded on the shaft 16 so that the sleeve will rotate and reciprocate with the shaft 16. The outer diameter of the sleeve 26 is slightly less than the inner diameter of the cylindrical surface portion 22 so that there is a slight clearance, between about 0.003 inches and 0.022 inch, between the cylindrical surface portion 22 and the sleeve 26 depending on the material being treated. The sleeve 26 has an external, variable pitch thread 32 extending from its front end to a point just within the seal housing 28. The thread 32 varies from a wide pitch, about 2 inches, at the front end of the sleeve 26, to a finer pitch, about 0.5 inch, at the point just within the seal housing 28. The thread 32 is directed inwardly toward the inside of the housing 12 so that when the sleeve 26 is rotating with the shaft 16, any plastic which enters the thread 32 will be pushed back to the inside of the housing 12.

The seal housing 28 is formed of a cylindrical bushing 34 which has an internal diameter equal to the internal diameter of the cylindrical surface 22 and a flange 36 extending radially outwardly from its inner end. The inner surface of the bushing 34 has therein a plurality of circumferentially spaced, longitudinally extending grooves 37 which extend from the outer end thereof to substantially the flange 36. An outer ring 38 extends around the bushing 34 and is secured to the flange 36 by screws 40. The ring 38 has a recess 42 in its inner surface. An annular cover 44 extends around the bushing 34 and is secured to the ring 38 by screws 46. The cover 44 extends across the end of the recess 42 so that the recess 42 forms with the cover 44 and bushing 34 an enclosed chamber 48. A sealing ring 50 is provided between the outer ring 38 and the bushing 34 at one end of the chamber 48, and at the other end of the chamber, sealing rings 52 and 54 are provided between the cover 44 and the outer ring 38 and bushing 34 respectively. Inlet and outlet openings 56 and 58 extend through the cover 44 to the chamber 48 through which a flow of a heat control medium can be provided through the chamber 48. A sealing ring 60 is provided between the flange 36 and the adjacent surface of the housing 12.

In the operation of the extruding apparatus 10, the thermoplastic material in dry particulate form is fed through the inlet opening 20 in the housing 12 to the rotating shaft 16. Most of the plastic material is carried by the shaft threads 18 toward the front end of the housing 12 to the pelletizing mechanism. However, some of the plastic material will flow or be forced back into the shaft seal 24. The plastic material that does enter the shaft seal 24 will flow through the clearance between the sleeve 26 and the cylindrical surface 22. Most of this plastic material will fall within the threads 32 and will be forced by the rotation of the sleeve 26 back toward the inlet opening 20. However, because of the pressure of the material entering through the inlet opening 20 a small portion of the plastic material entering the shaft seal 24 will flow along the sleeve 26 until it enters the clearance between the sleeve 26 and the bushing 34. The plastic material that does enter the clearance between the sleeve 26 and the bushing 34 will be worked by the relative rotation between the sleeve 26 and the bushing 34 as well as by the finer pitched threads just prior to the bushing 34. This combined working of the plastic material will cause it to heat up and flux to a molten state. By controlling the viscosity of the plastic in the space between the sleeve 26 and bushing 34, the plastic material will act as a seal to prevent the loss of plastic material but will still allow relative rotation between the shaft 16 and the housing 12. It has been found that good sealing action is obtained when the viscosity of the plastic material is such that a small extrusion of the plastic material is provided from the back end of the shaft seal 24. The grooves 37 in the inner surface of the bushing 34 provide uniform distribution of the fluxed material around the sleeve 26 to provide good sealing even if there are slight eccentricities in the rotation of the shaft. The viscosity of the plastic in the space between the sleeve 26 and bushing 34 is controlled by a temperature control medium flowed through the chamber 48. For a plastic material which is of polyvinylchloride filled with carbon particles, maintaining the plastic at a temperature of about 300° F. has been found to provide the plastic with a viscosity suitable for forming a good seal. However, proper fluxing of the plastic material can be achieved by optimizing the clearance between the sleeve 26 and bushing 34 which would eliminate the need of a temperature control medium.

Thus, there is provided by the shaft seal 24 of the present invention an extruder in which there is no packing material which can contaminate the material being sealed and in which the material being sealed forms its own sealing action between the shaft and the housing. Although there is some loss of the plastic material through the shaft seal 24, the amount is very small and does not interfere with the proper operation of the apparatus 10 being sealed. In addition, it has been found that the time that any material which is forced back to the screw thread 18 remains with the variable pitch thread 32 is sufficiently short that the material does not degrade. If this material were to degrade, it would contaminate the material passing through the extruder.

I claim:

1. In an apparatus which includes a housing having a passage extending from the exterior of the housing to an inlet opening within the interior of the housing through which dry particulate thermoplastic material enters the interior of said housing, a shaft rotatably supported in said housing and extending through said passage, and a seal between said shaft and a surface of said passage for limiting flow of the particulate material through said passage along said shaft, the improvement comprising
the seal including a sleeve surrounding and secured to the shaft to rotate therewith, said sleeve extending along said surface of the passage, and having in its outer surface a variable pitch thread with the threads being directed toward the inlet opening within the housing so as to direct most of the particulate material entering the threads in a direction back into the housing upon rotation of the shaft but allowing a small amount of material to flow along the passage in a direction opposite to the interior of the housing;
the sleeve having a cylindrical portion extending along the surface of the passage from the threads to the exterior of the housing and being slightly spaced from said surface of the passage; and
heat control means surrounding and being remote from said space between the cylindrical portion of the sleeve and the surface of the passage to maintain the small amount of material which flows into the space in a molten condition.

2. An apparatus in accordance with claim 1 in which the heat controlling means includes a chamber in a housing around said portion of the surface of the passage and means for allowing the flow of a heat control medium through said chamber.

3. An apparatus in accordance with claim 2 in which the housing containing the heat control chamber includes a bushing surrounding the sleeve and having a radially outwardly extending flange at one end, a ring surrounding the bushing and secured to the flange, said ring having a recess in its inner surface, and a cover around the bushing and secured to the ring, said cover extending across and enclosing the recess in the ring to form the chamber.

4. An apparatus in accordance with claim 3 including inlet and outlet passages extending through the cover into the chamber.

5. An apparatus in accordance with claim 1 in which the pitch of the thread in the sleeve varies from a larger pitch at its end within the housing to a finer pitch at the cylindrical portion.

6. An apparatus in accordance with claim 5 in which the pitch of the thread in the sleeve varies from about 0.5 inch at its end within the housing to about 2 inches at the cylindrical portion.

* * * * *